United States Patent [19]
Dehmlow

[11] Patent Number: 5,897,183
[45] Date of Patent: Apr. 27, 1999

[54] EXTERNAL LUMINAIRE FOR PANEL OR RACK MOUNTED DISPLAY UNITS

[75] Inventor: Brian P. Dehmlow, Cedar Rapids, Iowa

[73] Assignee: Rockwell Science Center, Inc., Thousand Oaks, Calif.

[21] Appl. No.: 08/907,115

[22] Filed: Aug. 6, 1997

[51] Int. Cl.⁶ .................. G02F 1/1333; G02F 1/1335; F21V 7/04; G01D 11/28
[52] U.S. Cl. .................. 349/58; 349/65; 362/31; 362/26
[58] Field of Search .................. 349/65, 58; 362/31, 362/26

[56] References Cited

U.S. PATENT DOCUMENTS

| | | | |
|---|---|---|---|
| 5,654,779 | 8/1997 | Nakayama et al. | 349/58 |
| 5,659,376 | 8/1997 | Uehara et al. | 349/58 |
| 5,666,172 | 9/1997 | Ida et al. | 349/58 |
| 5,680,183 | 10/1997 | Sasuga et al. | 349/58 |

*Primary Examiner*—Hung Xuan Dang
*Assistant Examiner*—Joanne Kim
*Attorney, Agent, or Firm*—Kyle Eppele; James P. O'Shaughnessy

[57] ABSTRACT

A non-emissive display unit such as a liquid crystal display is disclosed. The non-emissive display unit is adapted for mounting in a rack or panel. The non-emissive display unit includes a display cabinet and a non-emissive display device which is coupled to the display cabinet such that insertion of the display cabinet into the rack or panel mechanically and/or electrically couples the non-emissive display device to the rack or panel. The non-emissive display unit also includes a light source mounted to the rack or panel adjacent the display cabinet such that the light source can be removed and replaced from the rack or panel without decoupling or removing the non-emissive display device from the display cabinet. Insertion of the display cabinet into the rack or panel optically couples the display device inside the cabinet to the light source mounted to the rack or panel.

15 Claims, 5 Drawing Sheets

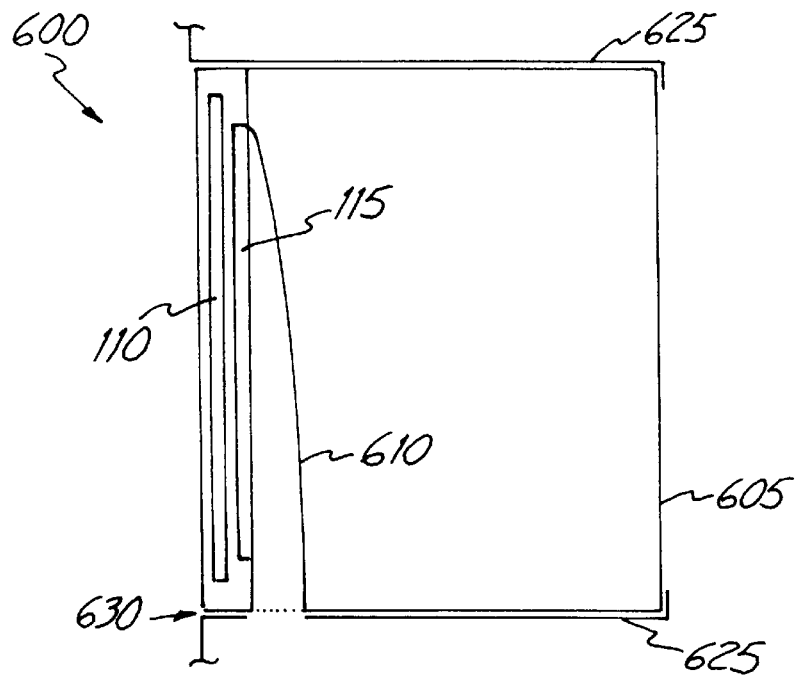
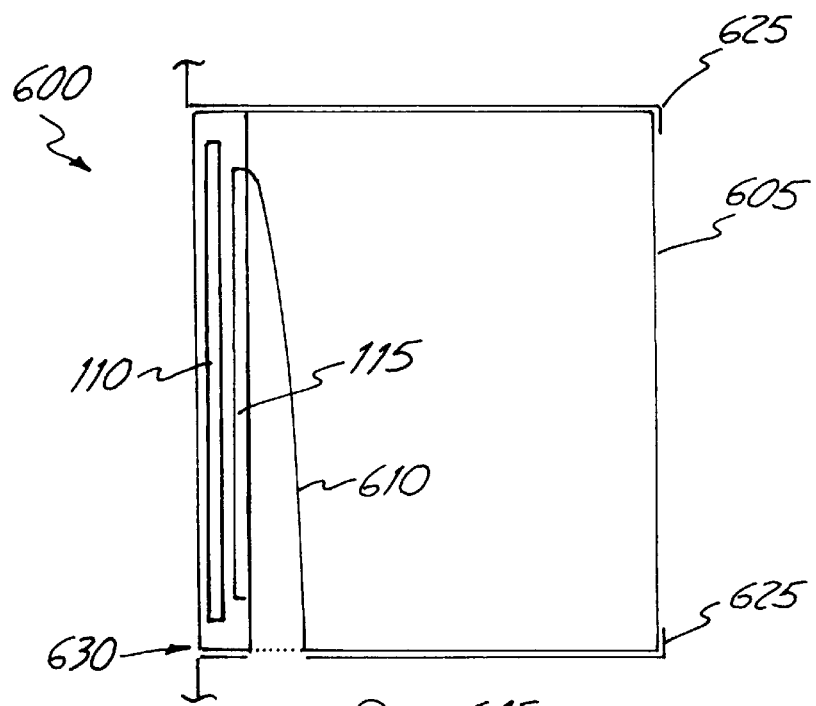

EXTERNAL LUMINAIRE FOR PANEL OR RACK MOUNTED DISPLAY UNITS

FIELD OF THE INVENTION

The present invention relates generally to non-emissive displays such as liquid crystal displays (LCDs). More particularly, the present invention relates to a display unit having an external luminaire providing backlighting and which can be replaced without disassembling the display unit.

BACKGROUND OF THE INVENTION

In traditional display units utilizing non-emissive display elements (such as LCDs, electrochromic displays and electrophoretic displays), lamps or luminaires are required to provide light emission. Typically, the lamps are fluorescent, incandescent, or discharge lamps. In existing display designs, the lamps which provide backlighting are mounted inside of a display cabinet or housing. In addition to the lamps, the display cabinet also typically contains the display element, a diffuser, and reflectors or lightpipes for redirecting light toward the diffuser and the display element. In order to mount the display unit in a rack or panel for use, the display cabinet is typically inserted into an opening in the rack or panel. Once inserted into the opening of the rack or panel the display unit receives power and control/data signals, typically via a rear connector, needed to display information to the users of the display unit.

In these existing configurations, the display unit must be disassembled when an internal lamp needs to be replaced. Disassembly of the display unit typically requires that the components of the display unit be removed from the display cabinet and that the display cabinet be removed from the opening in the rack or panel. Since lamps have very short life expectancies as compared to other components, this requires frequent disassembly and repair of the display unit. These frequent repair operations significantly reduce the mean time between failure (MTBF) of the display unit, and thus increase the cost of ownership of the display unit. Also, these frequent repair operations increase the risk of introducing new and unrelated failures or damage to the display unit during disassembly or assembly.

SUMMARY OF THE INVENTION

A non-emissive display unit such as a liquid crystal display is disclosed. The non-emissive display unit is adapted for mounting in a rack or panel. The non-emissive display unit includes a display cabinet and a non-emissive display device which is at least partially contained within the display cabinet such that insertion of the display cabinet into the rack or panel inserts the non-emissive display device into the rack or panel. The non-emissive display unit also includes a light source mounted to the rack or panel adjacent the display cabinet such that the light source provides illumination onto the display device, yet can be removed from the rack or panel and replaced without disassembling the display unit.

BRIEF DESCRIPTION OF THE DRAWINGS

The invention may be more fully understood by reading the following description of a preferred embodiment of the invention in conjunction with appended drawings wherein:

FIGS. 6, 7, 8, 9, and 10 are a diagrammatic top views illustrating the manner in which the display units of the present invention can be mounted in a rack or panel, with the luminaire located externally from the display cabinet, such that the luminaire or lamp can be replaced without disassembling the display unit.

DETAILED DESCRIPTION OF THE PREFERRED EMBODIMENTS

Figure 1:
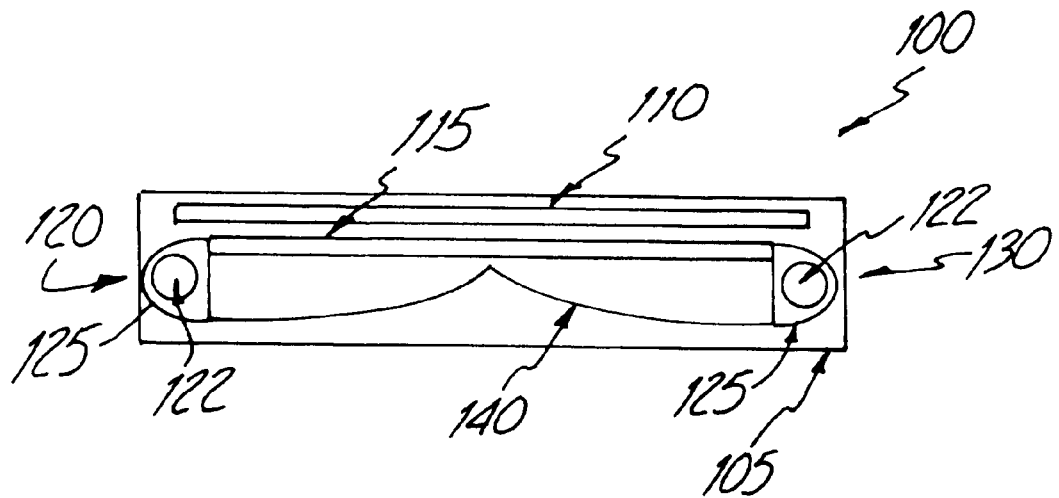
FIG. 1 is a diagrammatic top view of a prior art display unit having an edge-lighted luminaire with dual lamps contained within the display cabinet.
Figure 2:
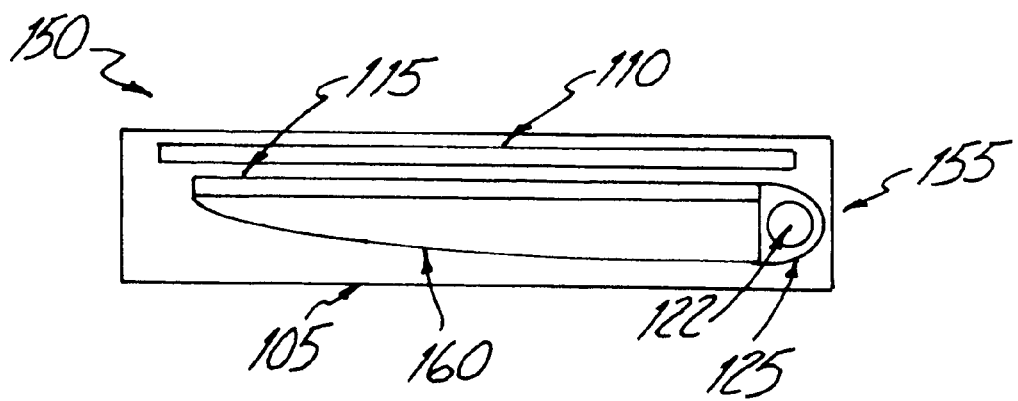
FIG. 2 is a diagrammatic top view of a second prior art display unit having an edge-lighted luminaire with a single lamp contained within the display cabinet.

FIGS. 1 and 2 are diagrammatic top views of prior art display units 100 and 150 having edge-lighting provided by luminaires or lamps. Each of display units 100 and 150 include a display cabinet or housing 105, a display device or element 110 such as an LCD, and a diffuser 115 for diffusing light before it passes through display device 110. Display unit 100 includes dual lamp assemblies 120 and 130, each mounted on a separate edge or side of display cabinet 105. Each lamp assembly includes a lamp 122 and a reflector 125 for redirecting light from the lamp toward the center of the display cabinet. Display unit 100 also includes reflector or lightpipe 140 positioned within display cabinet 105 at a location adapted for redirecting light from lamp assemblies 120 and 130 toward diffuser 115 and display device 110. It is notable that display cabinets of the prior art display units and of the display units of the present invention typically completely enclose the display element, diffuser and other components of the display unit. Therefore, these components are not actually visible in a top view. However, for ease of illustration and understanding by the reader, the elements located within the display cabinets are shown diagrammatically in the top views of the included FIGS.

The edge-lighting luminaire of display unit 150 includes only a single lamp assembly 155 having lamp 122 and reflector 125. Accordingly, reflector or lightpipe 160 located within display cabinet 105 has a different shape adapted for maximizing the reflection of light from lamp assembly 155 toward diffuser 115 and display device 110.

In use, display cabinet 105 of either of display units 100 and 150 is inserted into an opening in an instrument panel (for example, a panel of the type which are common in avionics or automotive applications), or in an equipment rack (such as for test equipment). Lamps 122 have very short life expectancies as compared to other components of display units 100 and 150. With the lamp assemblies mounted inside of display cabinet 105 as shown in FIGS. 1 and 2, the display units must be removed from the rack or panel and disassembled in order to replace a failed lamp. These frequent repair operations significantly reduce the MTBF of the display units as a whole. This results in a significant increase in the cost of ownership of the display units.

Further, during these repair operations in which lamps are replaced, unrelated failures or damage to the display units can occur during disassembly or reassembly.

Figure 3:
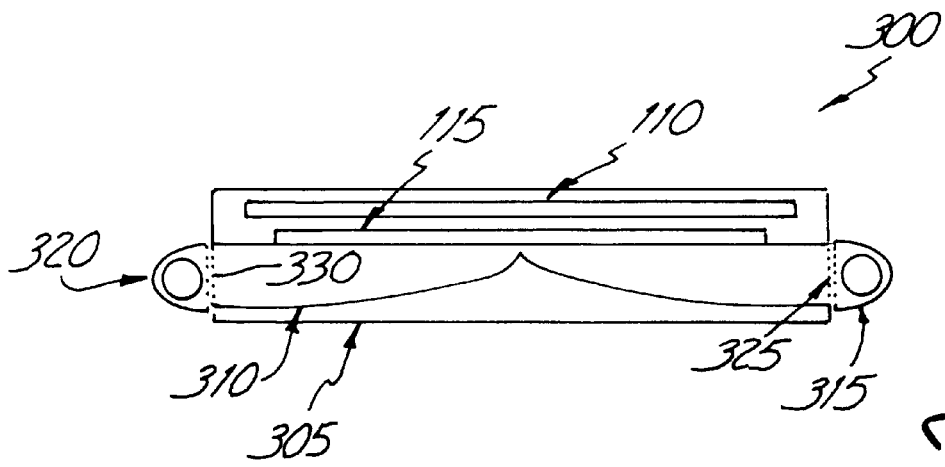
FIG. 3 is a diagrammatic top view of a display unit, in accordance with first embodiments of the present invention, having an edge-lighted luminaire with dual lamps located externally from the display cabinet on either side of the display unit.

FIG. 3 is a diagrammatic top view of edge-lighted display unit 300 of the present invention having two separate lamp assemblies or luminaires, with one on each side of the display unit. Display unit 300 includes display cabinet 305, display device 110, diffuser 115, internal reflector or light-pipe 310, first external luminaire or lamp assembly 315, second external luminaire or lamp assembly 320, first transparent window 325 and second transparent window 330. As is typical in the prior art, each of display device 110, diffuser 115 and internal reflector 310 are located within or are securable to display cabinet 305.

Unlike the prior art, display unit 300 includes externally located lamp assemblies 315 and 320 which provide light for use by display device 110. As discussed below in greater detail with reference to FIGS. 6, 7 and 8, external lamp assemblies 315 and 320 are preferably mountable to the equipment rack or panel in which display cabinet 305 (and thus display unit 300) is inserted. As with the prior art, each of lamp assemblies 315 and 320 typically includes a lamp and a reflector. With lamp assemblies 315 and 320 located externally from display cabinet 305, in order for lamp assemblies 315 and 320 to provide light for use by display device 110, display cabinet 305 includes transparent windows 325 and 330 positioned adjacent lamp assemblies 315 and 320, respectively. Transparent windows 330 and 325 can be either apertures in display cabinet 305, or can be made of transparent material such as glass or plastic. Light from lamp assemblies 315 and 320 is thus directed through transparent windows 325 and 330, respectively, and toward internal reflector or lightpipe 310. In a conventional manner, internal reflector 310 redirects the light toward diffuser 115 and display device 110 for use in displaying information to a viewer of display unit 300.

Figure 4:
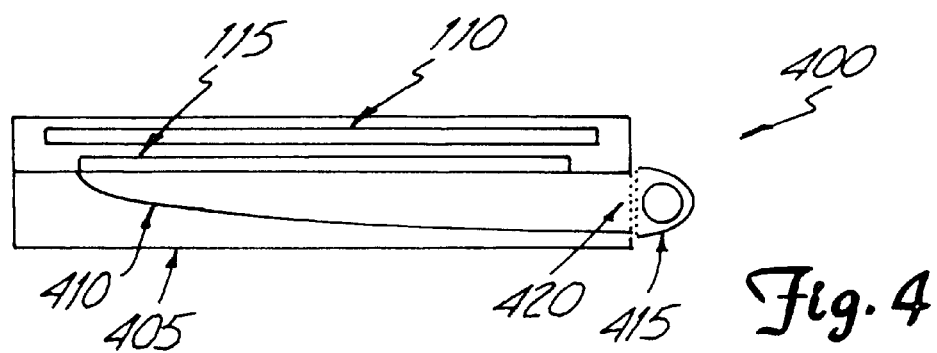
FIG. 4 is a diagrammatic top view of a display unit, in accordance second embodiments of the invention, having an edge-lighted luminaire with a single lamp located externally from the display cabinet.

FIG. 4 is a diagrammatic top view of display unit 400 in accordance with alternate embodiments of the present invention. Display unit 400 illustrated in FIG. 4 is similar to display unit 300, with the primary exception that it includes only a single lamp assembly. Display unit 400 includes display device 110, diffuser 115, display cabinet 405, internal reflector or lightpipe 410, lamp assembly 415 and transparent window 420. Since display unit 400 is edge-lighted with single lamp assembly 415, display unit 400 includes only a single transparent window 420 aligned with external lamp assembly 415. Also, the shape of reflector 410 is adapted for maximizing the amount of light from lamp assembly 415 which is redirected toward diffuser 115 and display device 110.

Figure 5:
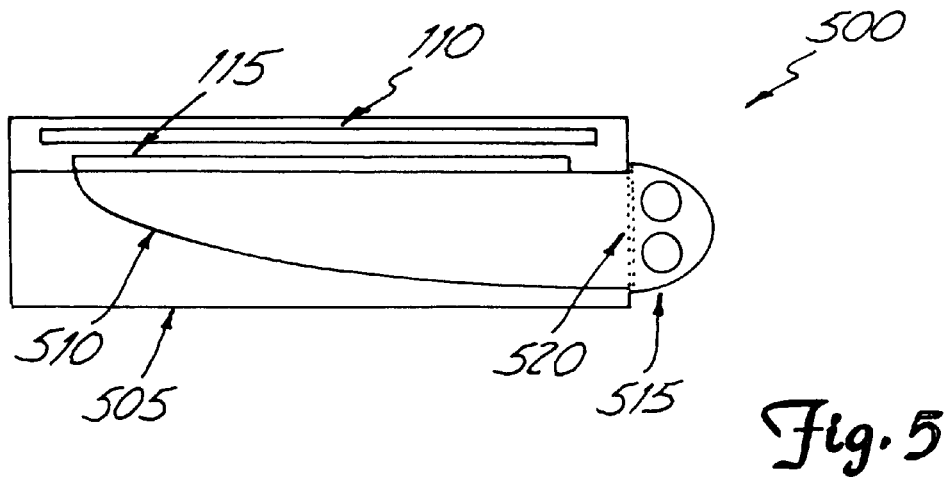
FIG. 5 is a diagrammatic top view of a display unit, in accordance with third embodiments of the invention, having an edge-lighted luminaire with multiple lamps on a single side and located externally from the display cabinet.

FIG. 5 is a diagrammatic top view of display unit 500 in accordance with third embodiments of the present invention. Display unit 500 includes display device 110, diffuser 115, display cabinet 505, internal reflector or lightpipe 510, lamp assembly 515 and transparent window 520. Display unit 500 is similar to display unit 400, except that it includes a single multi-lamp assembly 515 located externally from display cabinet 505. Thus, the size of transparent window 520 is increased to maximize the quantity of light from lamp assembly 515 which enters into display cabinet 505. Further, the shape of reflector 510 is altered slightly to maximize the quantity of light redirected toward diffuser 115 and display device 110.

Figure 6:
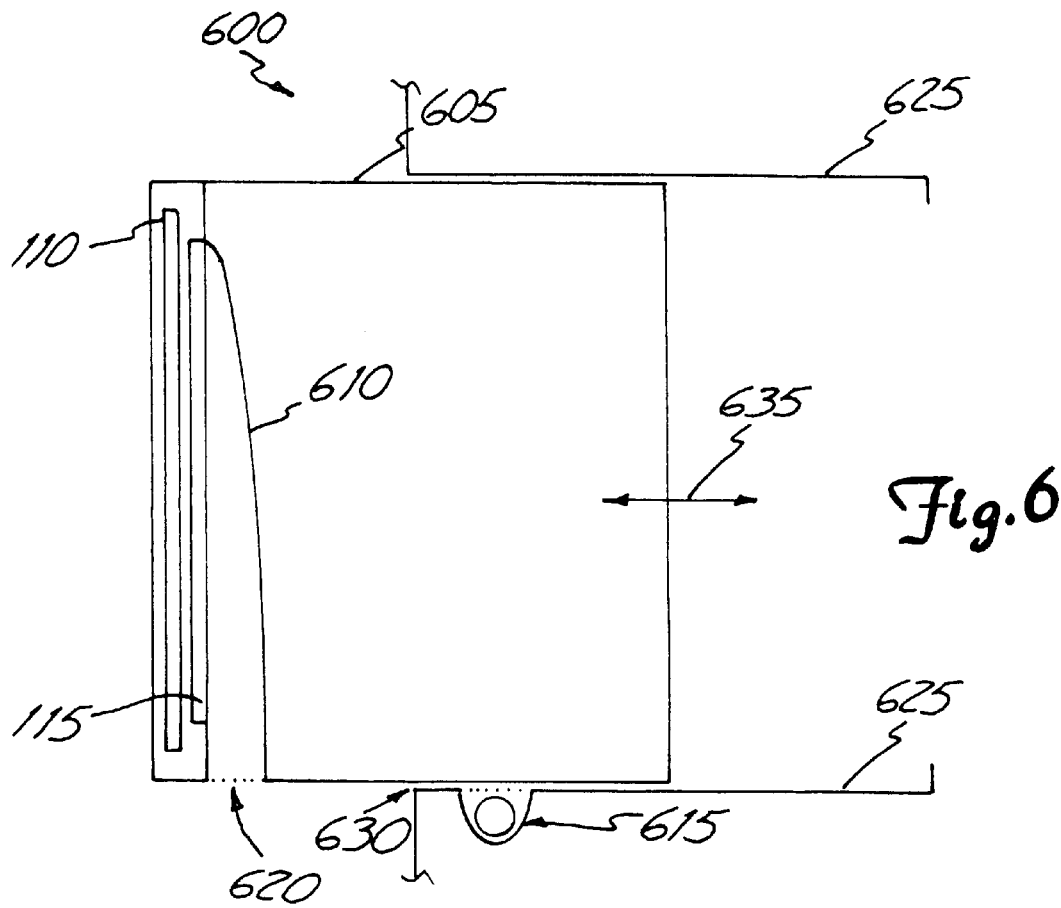
Figure 7:
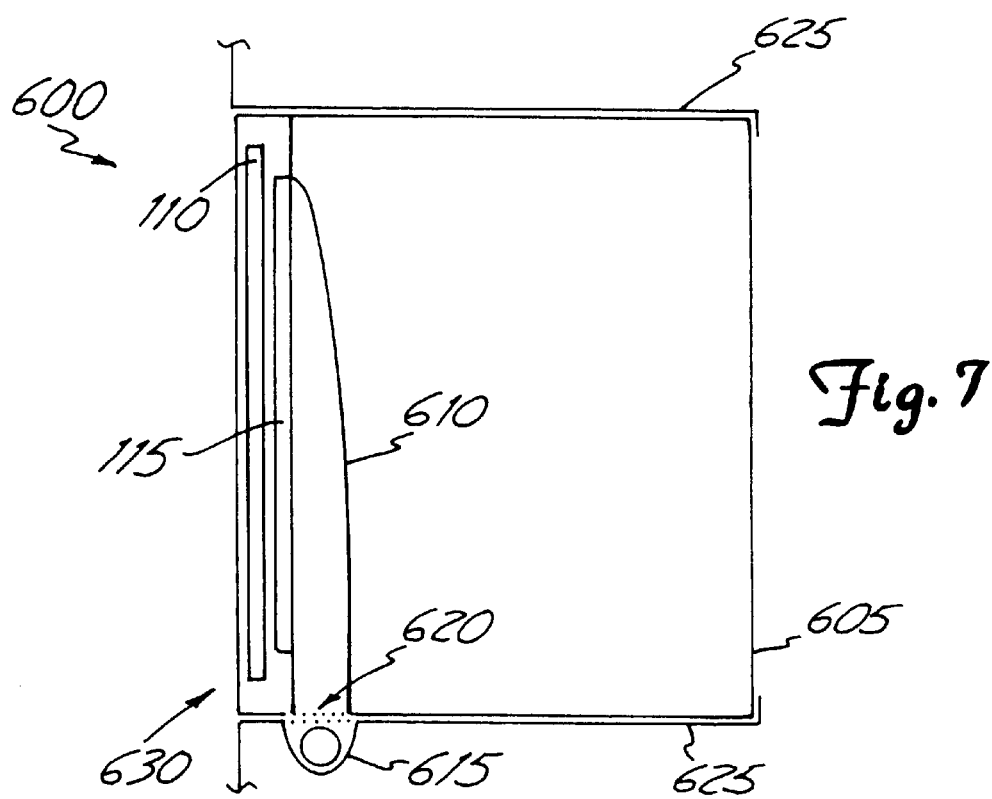

FIGS. 6 and 7 are diagrammatic top views of a display unit 600 of the present invention illustrating the manner in which the display unit is positioned in a panel or equipment rack with its lamp assembly positioned such that it can be removed for replacement without disassembly of the display unit. Like the display units illustrated in FIGS. 3–5, display unit 600 includes display device 110, diffuser 115, and internal reflector 610, all located within or attached to display cabinet or housing 605. Display unit 600 also includes transparent window 620 in display cabinet 605. Lamp assembly 615 is attached to rack or panel 625, typically prior to insertion of display cabinet 605 into opening 630 in the rack or panel. Insertion and removal of display cabinet 605 into and out of opening 630 is represented by arrow 635. Thus, FIGS. 6 and 7 illustrate a front loading of display unit 600 into the rack or panel. However, the invention is equally applicable to display units which are loaded from other directions such as the top or side.

As shown in FIG. 7, with display cabinet 605 fully inserted into opening 630 in rack or panel 625, window 620 in cabinet 605 is aligned with lamp assembly 615 such that light from lamp assembly 615 is directed toward the interior of display cabinet 605 where it will be reflected toward display device 110 and diffuser 115 by reflector 610.

FIG. 8 is a diagrammatic top view of display unit 600 which illustrates removal of lamp assembly 615 from rack or panel 625 for replacement. As can be seen in FIG. 8, lamp assembly 615 can be removed without disassembling other portions of display unit 600, and even without removing display cabinet 605 from opening 630.

FIG. 9 is a diagrammatic top view of display unit 600 which illustrates an alternate method for removal of lamp 645 for replacement. In this method, lamp 645 and reflector 640 are removed from rack or panel 625. Lamp 645 is further removed from reflector 640 and discarded. A new lamp 645 is inserted into the reused reflector 640 before reattaching the complete lamp assembly to rack or panel 625. As shown previously, FIG. 9 also shows that lamp 645 can be removed without disassembling other portions of display unit 600, and even without removing display cabinet 605 from opening 630.

Figure 10:
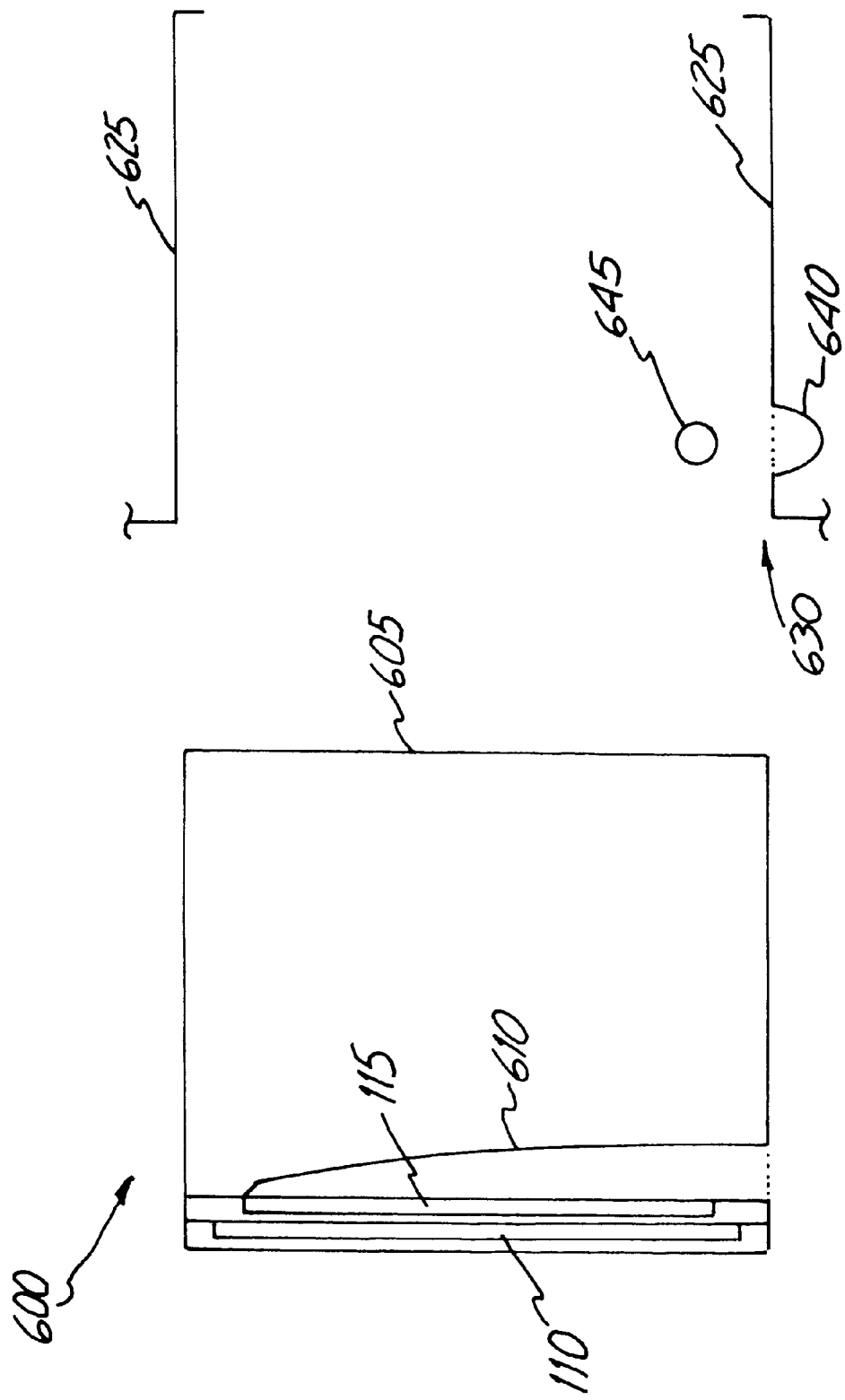

FIG. 10 is a diagrammatic top view of display unit 600 which illustrates another alternate method for removal of lamp 645 for replacement. This method requires that display cabinet 605 first be removed from opening 630. Lamp 645 is then directly removed from reflector 640 which remains attached to rack or panel 625. A new lamp 645 is inserted into reflector 640 before reinserting display cabinet 605 into opening 630. FIG. 10 shows that lamp 645 can be removed without disassembling other portions of display unit 600.

The display units of the present invention, having the lamp assemblies located outside of the display cabinet so that the lamp or lamp assemblies can be replaced without disassembly of the display unit, provide numerous advantages over the prior art. For example, these aspects of the present invention significantly reduce the cost associated with lamp replacement. Simultaneously, the present invention increases the reliability of the display unit by minimizing the necessity for the display unit to be removed from the rack or panel or disassembled. Using the present invention, the display units preferably use passive systems, such as reflectors or lightpipes, to distribute the light to the display elements. As is clear from the various embodiments of the present invention, the number and/or location of the externally located lamps is very flexible and can be adapted for the particular requirements of the display system.

Although the present invention has been described with reference to preferred embodiments, workers skilled in the art will recognize that changes may be made in form and detail without departing from the spirit and scope of the invention. For example, while FIGS. 6, 7, 8, 9, and 10 illustrate the externally positioned lamp assemblies integrated into a front-removal equipment rack or instrument panel, the display unit of the present invention is equally applicable to systems in which the display is removed in other directions, such as upward or to the side.

What is claimed is:

1. A non-emissive display apparatus adapted for mounting in a rack or panel, the non-emissive display apparatus comprising:

a display cabinet adapted for insertion into the rack or panel;

a non-emissive display device housed within the display cabinet which uses a separate source of light in order to display information to a viewer of the non-emissive display apparatus, wherein insertion of the display cabinet into the rack or panel includes an insertion of the non-emissive display device into the rack or panel; and a light source providing the separate source of light used by the non-emissive display device to display information to the viewer, wherein the light source is mounted to the rack or panel adjacent to and outside of the display cabinet such that the light source can be decoupled from the rack or panel without removing the non-emissive display device from the display cabinet and without removing the display cabinet and the non-emissive display device from the rack or panel.

2. The non-emissive display apparatus of claim 1, wherein the light source is mounted to the rack or panel such that the display cabinet can be removed from the rack or panel without removing the light source from the rack or panel.

3. The non-emissive display apparatus of claim 1, wherein the display cabinet includes a window through which light from the light source can enter into the display cabinet when the display cabinet is positioned in the rack or panel and the light source is mounted to the rack or panel.

4. The non-emissive display apparatus of claim 3, and further comprising at least one reflector positioned within the display cabinet at a location selected such that light from the light source which enters the display cabinet through the window is reflected toward the non-emissive display device for use in displaying information to the viewer.

5. The non-emissive display apparatus of claim 4, wherein the non-emissive display device is a liquid crystal display.

6. The non-emissive display apparatus of claim 4, wherein the light source is a fluorescent lamp.

7. A display apparatus adapted for mounting in a rack or panel, the display apparatus comprising:

a housing adapted for insertion into an opening in the rack or panel, wherein the housing includes first and second windows through which light can enter when the housing is inserted into the opening in the rack or panel;

a non-emissive display coupled to and supported by the housing, the non-emissive display using a separate source of light in order to display information to a person viewing the display apparatus;

first and second light sources attachable to the rack or panel in first and second positions, respectively, which are adjacent the first and second windows, respectively, of the housing when the housing is inserted into the opening in the rack or panel, wherein when attached to the rack or panel in the first and second positions adjacent the housing the first and second light sources provide the separate source of light used by the non-emissive display to display information to the person viewing the display apparatus, wherein the first and second light sources can be detached from the rack or panel without uncoupling the non-emissive display and the housing; and at least one reflector positioned within the housing at a location selected such that light from the first and second light sources which enters the housing through the first and second windows is reflected toward the non-emissive display for use in displaying information to the user.

8. The display apparatus of claim 7, wherein the housing can be removed from the opening in the track or panel without detaching the first and second light sources from the rack or panel.

9. The display apparatus of claim 7, wherein the first and second light sources can be detached from the rack or panel without removing the housing from the opening in the rack or panel.

10. The display apparatus of claim 7, wherein the non-emissive display is a liquid crystal display.

11. The display apparatus of claim 10, wherein the first light source is a fluorescent lamp.

12. A liquid crystal display adapted for insertion into a rack or panel, the liquid crystal display comprising:

a housing adapted for insertion into the rack or panel;

a liquid crystal device positioned within the housing such that insertion of the housing into the rack or panel inserts the liquid crystal device into the rack or panel; and a fluorescent lamp providing a source of light used by the liquid crystal device to display information to a viewer, wherein the fluorescent lamp is mounted to the rack or panel adjacent and outside the housing such that the fluorescent lamp can be removed from the rack or panel without removing the liquid crystal device from the housing and such that the housing can be removed from the rack or panel without removing the fluorescent lamp from the rack or panel.

13. The liquid crystal display of claim 12, wherein the fluorescent lamp is mounted to the rack or panel such that the fluorescent lamp can be removed from the rack or panel without removing the housing from the rack or panel.

14. The liquid crystal display of claim 12, wherein the housing includes a window through which light from the fluorescent lamp can enter into the housing when the housing is positioned in the rack or panel and the fluorescent lamp is mounted to the rack or panel.

15. The liquid crystal display of claim 14, and further comprising at least one reflector positioned within the housing at a location selected such that light from the fluorescent lamp which enters into the housing through the window is reflected toward the liquid crystal device for use in displaying information to the viewer.

* * * * *